United States Patent [19]

Press

[11] 4,193,180
[45] Mar. 18, 1980

[54] METHOD OF FORMING A HEAT EXCHANGER

[75] Inventor: Irving D. Press, West Orange, N.J.

[73] Assignee: Resistoflex Corporation, Roseland, N.J.

[21] Appl. No.: 773,750

[22] Filed: Mar. 2, 1977

[51] Int. Cl.² .......................... B05D 3/02; B23P 15/26
[52] U.S. Cl. .............................. 29/157.4; 29/157.3 R; 156/244.13; 165/33; 427/195; 427/358
[58] Field of Search .................... 427/27, 33, 185, 195, 427/355, 356, 358; 165/133; 403/23, 286; 138/109, 155, 149; 29/157 T, 157.4, 157.3 R; 264/173; 156/244.12, 244.13, 149

[56] References Cited

U.S. PATENT DOCUMENTS

| | | | |
|---|---|---|---|
| 2,923,640 | 2/1960 | Buckingham | 165/133 X |
| 3,203,404 | 8/1965 | Miller | 165/133 X |
| 3,226,245 | 12/1965 | Dettling et al. | 427/185 |
| 3,227,636 | 1/1966 | De Hart | 427/185 X |
| 3,265,124 | 8/1966 | Reys | 165/133 |
| 3,518,110 | 6/1970 | Fischbein | 427/427 |
| 3,526,027 | 9/1970 | Manuel et al. | 427/185 X |
| 3,690,298 | 9/1972 | Venturi | 427/185 X |
| 3,731,710 | 5/1973 | Bauer et al. | 138/109 X |
| 3,802,908 | 4/1974 | Emmons | 427/409 X |
| 3,834,009 | 9/1974 | Iida et al. | 264/173 X |
| 3,912,005 | 10/1975 | Griffiths | 165/133 X |
| 3,936,569 | 2/1976 | Miller | 427/185 X |
| 3,946,125 | 3/1976 | Scheiber | 427/46 |

FOREIGN PATENT DOCUMENTS

| | | | |
|---|---|---|---|
| 733462 | 5/1966 | Canada | 427/195 |
| 2515007 | 10/1976 | Fed. Rep. of Germany | 165/133 |

*Primary Examiner*—Shrive P. Beck
*Attorney, Agent, or Firm*—Watson, Leavenworth, Kelton & Taggart

[57] ABSTRACT

A structure having at least two joined contiguous parts, of which at least one is straight and of uniform girth throughout its length, is jacketed with a given fluorocarbon resin by first cross feed extruding a jacket of said resin onto said one part, next providing a joint between said one part and another part, and thereafter coating at least said joint, any exposed surfaces of said one part present between said joint and the adjacent end of said jacket, and a narrow circumferential band at said adjacent end of said jacket with said given resin by spraying in dry powder form, and then applying heat to fuse said sprayed on resin. A heat exchanger is described where the exchanger tubes constitute the straight parts and the manifolds to which they are brazed the other parts.

9 Claims, 6 Drawing Figures

U.S. Patent
Mar. 18, 1980
4,193,180
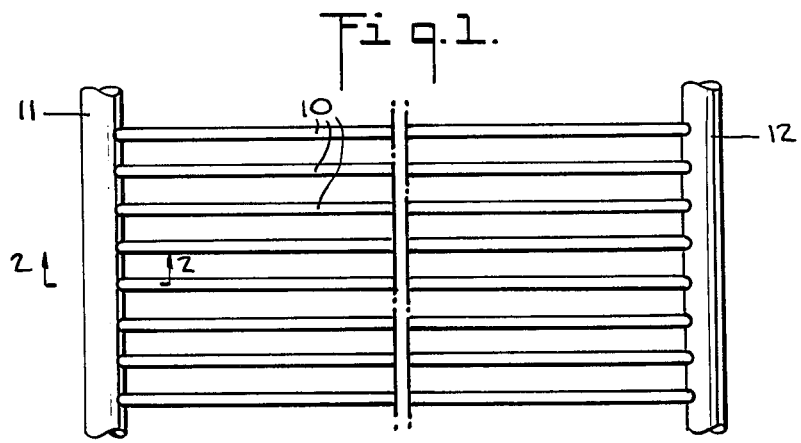
Fig.1.
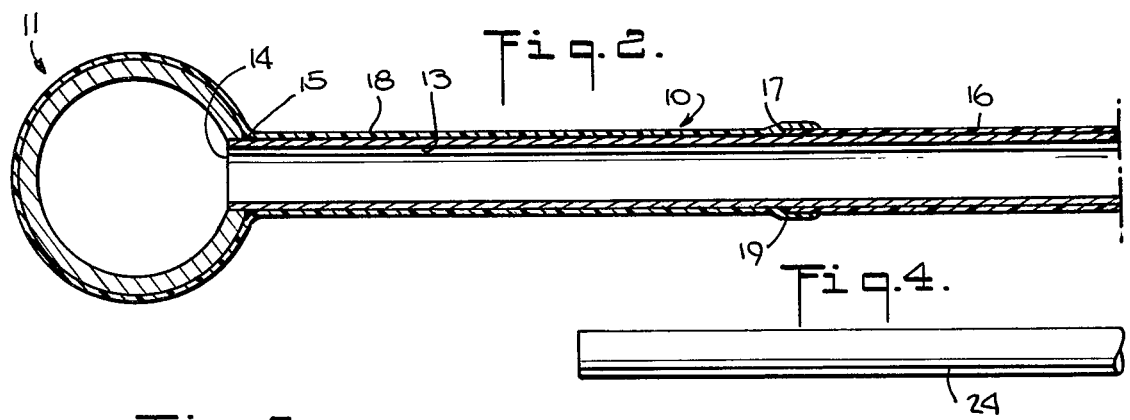
Fig.2.
Fig.4.
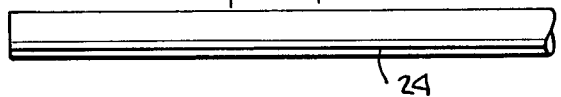
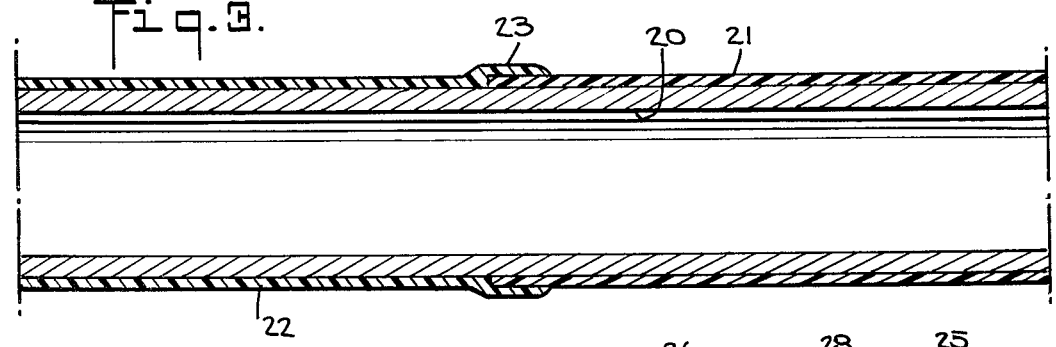
Fig.3.
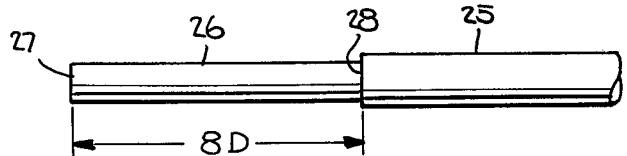
Fig.5.
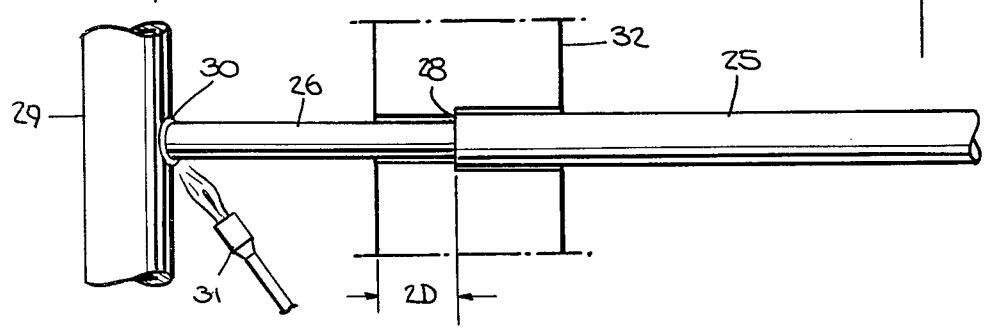
Fig.6.

METHOD OF FORMING A HEAT EXCHANGER

The present invention relates to plastic coated structures generally and more specifically to heat exchangers for use in a corrosive environment and to the method of manufacture thereof.

In the construction of a heat exchanger for operation in a corrosive environment it is necessary to balance conflicting design requirements. Optimally, the heat exchanger tubes are constructed of material having maximum heat transmittance with adequate structural strength, minimum wall thickness and resistance to chemical attack by the media to be encountered both within and without. Structural strength requirements are determined by internal and external fluid pressures as well as beam loads due to the dead weight of the tubes and dynamic loads from motion in the form of vibration or acceleration or both. A good compromise is to use a metal tube externally coated or jacketed with a corrosion resistant material. Heat exchanger tubes made entirely of fluorinated ethylene propylene (FEP) resin are known and such resin is suitable as an exterior coating for the foregoing purpose. Also suitable are polyvinylidene fluoride ($PVF_2$) and perfluoroalkoxy (PFA) resins. The problem is to obtain a complete encasement of the metal of the heat exchanger, not only that of the tubes but the metal of the associated manifolds or the like, free from pinholes yet sufficiently thin so as not to cause inefficient heat transfer.

Various methods are known for coating metal with one of the foregoing fluorocarbon resins. The resin can be applied by spraying a liquid dispersion which is subsequently baked to dry and fuse. This procedure is capable of producing layers less than 1 mil thick and several coats are required to build up a coating of any appreciable thickness. Furthermore, only FEP resin is available at present as a liquid dispersion.

The resins in dry powder form can be sprayed electrostatically and then fused by the application of heat. This procedure can develop a layer 2 to 3 mils thick per coat and, under most conditions, necessitates the application of 2 to 3 coats to provide an acceptable corrosion resistant coating.

Where straight tubing of uniform O.D. is to be coated, it can be accomplished by cross feed extrusion. This method has the advantage that precise control is obtainable of the thickness of the coating or jacket and good homogeneity of the material results. The disadvantage is that the method is limited to straight tube lengths free from O.D. irregularities.

A variation of the last mentioned method is to produce a pre-stressed tube of the resin which is heat shrunk about a tube to be jacketed. This method is much more costly than cross feed extrusion because of the need for maintaining the cleanliness of the interior of the plastic tube as well as that of the O.D. of the metal tube until the resin tube is shrunk in place. Furthermore, the method becomes quite impractical when working with long lengths of metal tubing having an O.D. of the order of ⅛ inch.

A complete heat exchanger element may take the form of a grid containing a plurality of heat exchanger tubes connected between a pair of manifolds. The difficulty in covering such a structure with a homogeneous layer of fluorocarbon resin should be apparent. With that in mind, it is an object of the present invention to provide a method of coating metal elements with a fluorocarbon resin which method is capable of coating satisfactorily a complete heat exchanger element of the type mentioned. It is a further object of the invention to provide an improved heat exchanger element having a metal tube jacketed with a fluorocarbon resin.

While the invention is particularly useful in connection with the fabrication of heat exchangers and elements therefor, it also is useful in the fabrication of other plastic coated structures having at least two contiguous parts with a joint therebetween, at least one of which parts is straight and of uniform girth throughout its length.

In accordance with one aspect of the present invention there is provided a plastic coated structure comprising at least two such contiguous parts with a joint therebetween of which said one part is provided with a first jacket over the major part of its length of an extruded layer of a given fluorocarbon resin, said given resin being of the type which has a high viscosity in the melt stage, and a second jacket over at least said joint and any of said one part present between said joint and the adjacent end of said first jacket, said second jacket being a fused sprayed on layer of said given resin of which an end section is overlapped on and fused to a narrow circumferential band at said adjacent end of said first jacket.

In accordance with another aspect of the present invention there is provided a heat exchanger element for use in a corrosive environment comprising a metal tube jacketed over the major part of its length with an extruded layer of a given fluorocarbon resin having a thickness within the limits affording efficient heat transfer combined with resistance to corrosion of said tube, said given resin being of the type which has a high viscosity in the melt stage, and jacketed over at least part of the remainder of its length adjacent said extruded layer of resin with a fused sprayed on layer of said given resin of which an end section is overlapped on and fused to a narrow circumferential band at the adjacent end of said extruded layer of resin, said fused sprayed on layer of resin having a thickness sufficient to resist corrosion of said tube.

In accordance with a still further aspect of the present invention, there is provided a method for fabricating a structure jacketed with a fluorocarbon resin where said structure has at least two joined contiguous parts of which at least one is straight and of uniform girth throughout its length, said method comprising in combination the steps of cross feed extruding a jacket of a given fluorocarbon resin of the type having a high viscosity in the melt stage onto said one part, providing a joint between said one part and another part, and coating at least said joint, any exposed surfaces of said one part present between said joint and the adjacent end of said jacket, and a narrow circumferential band at said adjacent end of said jacket with said given resin by spraying in dry powder form, and thereafter applying heat to fuse said sprayed on resin to provide a continuous monolithic coating of resin over said structure.

The invention will be better understood after reading the following detailed description of the presently preferred embodiments thereof with reference to the appended drawings in which:

FIG. 1 is a fragmentary plan view of a typical heat exchanger element in grid form constructed in accordance with the present invention;

FIG. 2 is an enlarged fragmentary sectional view taken along line 2—2 in FIG. 1;

FIG. 3 is a fragmentary sectional view of a heat exchanger tube coated with a fluorocarbon resin and illustrating another embodiment of the invention;

FIG. 4 is a fragmentary view of one end of a heat exchanger tube during a preliminary step in the fabrication thereof;

FIG. 5 shows the tube of FIG. 4 at a subsequent stage in the fabrication thereof; and FIG. 6 shows the tube of FIG. 5 during a still further stage in the fabrication thereof.

Reference should now be had to the drawings wherein the same reference numerals are used throughout to designate the same or similar parts. In FIG. 1 there is illustrated a typical heat exchanger element consisting of a plurality of heat exchanger tubes 10 interconnected at their ends by brazed joints with manifolds 11 and 12.

As seen in FIG. 2 the heat exchanger tube or element 10 consists of a metal tube 13 having its end 14 inserted in an aperture in the wall of manifold 11 and brazed thereto at 15. The metal tube 13 is jacketed over the major part of its length, from a point near to end 14 to a point, not shown, near to the opposite end of the tube, with a layer 16 of extruded resin selected from the group of PFA, FEP and PVF$_2$ resins having a thickness within the limits of efficient heat transfer combined with resistance to corrosion of said tube. It has been found that a thickness no greater than 10 mils and preferably between 4 and 6 mils is optimum for this purpose.

Still referring to FIG. 2, it will be observed that the layer of extruded resin 16 terminates at 17. The remainder of the tube 13 between its end 14 and the end 17 of the layer 16 is jacketed with a fused sprayed on layer of the selected resin 18 of which an end section 19 is overlapped on and fused to a narrow circumferential band at the end of the layer 16 of extruded resin. The jacket 18 extends over the brazed joint 15 and about the manifold 11 so as to provide, with the extruded layer 16, a continuous monolithic coating of resin over the tube and manifold. With a heat exchanger tube in which the metal tube has an O.D. of about ⅜ inch, the distance between the end 17 of the layer 16 and the end 14 of the metal tube is preferably about 1 inch.

Before describing the procedure for fabricating the heat exchanger element of FIGS. 1 and 2, another embodiment of the invention will be described with reference to FIG. 3 to which attention should now be directed. There is shown in FIG. 3 a fragmentary section near one end of a heat exchanger tube component which may, for example, be in the form of a threaded pipe attached by appropriate couplings or the like to an adjacent component. The details of the threaded end or couplings are not important and have not been shown. The main structure is in the form of a metal tube 20 jacketed over the major portion of its length with an extruded layer 21 of a given fluorocarbon resin selected from the foregoing group having the requisite thickness as described previously, and jacketed over the remaining portions of its length adjacent the layer 21 with a fused sprayed on layer, e.g., the layer 22, of said given resin of which an end section 23 is overlapped on and fused to a narrow circumferential band at the adjacent end of the layer 21 in the same manner as described above with reference to FIG. 2. It will be understood that the sprayed on coating 22 can be applied after the metal tube 20 has been joined by the necessary coupling or the like such that the coating 22 can cover the coupling or associated component. Preferably, the length of tube 20 covered by the layer 22 should be maintained at a minimum subject to the requirements that will appear from the following description of the steps employed in applying the resin coatings to the metal tube.

The steps employed to fabricate the structure of FIGS. 1 and 2 will now be described. There is shown in FIG. 4 a heat exchanger tube element 24 after the metal tube base structure has been jacketed with a continuous layer of the selected resin by cross feed extruding directly thereon. The jacketing of the metal tubes can be accomplished in a continuous extrusion operation followed by the step of cutting the resultant stock to length as required.

The next step is to expose the ends of the tubes for a predetermined distance. This is shown in FIG. 5 wherein the resin jacket 25 has been removed from the metal tube 26 between the tube end 27 and the resin layer end 28. It is presently preferred that said predetermined distance be about 8 times the O.D. of the tube 26. This is indicated in FIG. 5 by the dimension "8D".

FIG. 6 illustrates the next step in the operation in which the tube 26 has its exposed end inserted in an aperture in metal manifold 29 with a brazing compound 30 located at the joint. Necessary heat to melt and fuse the brazing compound 30 may be applied by a torch indicated at 31. During the brazing step the temperature of the jacket 25 must be maintained below its melting point. This is best accomplished by surrounding the end of the jacket 25 and an adjacent portion of the exposed tube 26 with a chill block of which one half is shown at 32. The second half of the chill block, which would be on top as viewed in FIG. 6, has been omitted for clarity of illustration.

It has been found as a rule of thumb that the chill block should embrace a length of metal tube 26 shown by the dimension "2D" equal to about twice the O.D. of the metal tube 26. For a metal tube 26 having an O.D. of about ⅜ inch, it will be found satisfactory to have the chill block overlie the resin layer 25 by about ⅜ inch. The foregoing dimensions are furnished by way of illustration and are not deemed critical so long as the brazing can be accomplished without melting the resin layer 25.

After brazing as shown in FIG. 6, the chill block is removed and the major portion of the heat exchanger element 24 is masked in preparation for spraying the selected fluorocarbon resin in dry powder form. Electrostatic spraying techniques have been found satisfactory for applying a dry powder coating to the exposed metal surfaces as well as to a narrow circumferential band at the end of the layer 25 of extruded resin. It will be understood that in fabricating a plural element structure as shown in FIG. 1, all of the heat exchanger tubes 24 will be prepared and assembled to the manifolds and brazed before the dry powder spraying step. Preferably, the sprayed layer will have a finished thickness about the same or greater than that of the extruded layer. A thickness of at least 4 mils is desirable to ensure corrosion protection. This may necessitate the application of two coats by spraying followed in each instance by fusing. After spraying with dry powder, the sprayed resin is fused by applying heat thereto with care being taken to avoid melting the extruded jackets on the metal tubes except for at least softening to fusion condition the narrow band covered by the dry powder.

With the procedure outlined above, copper tubing has been brazed at a temperature between about 1100° and 1200° F. (593.3° and 648.9° C.) while maintaining the near end of the extruded resin jacket below about 400° F. (204.44° C.). Fusing of the sprayed layer has been accomplished at about 623° F. (329.44° C.) in about 15 minutes.

One precaution must be exercised and that is to avoid the inclusion of residual stresses in the extruded layer of resin or it is liable to change dimension when heated during the step of fusing the sprayed layer. This could result in a faulty joint between the extruded and sprayed layers of resins.

It has been found that the foregoing procedure establishes a continuous monolithic coating of resin over the substructure and that the joint between the sprayed coating and the extruded coating, while exaggerated in the drawings for purposes of illustration, is barely discernible in the actual end product.

It should be understood that the brazed joints described above may be replaced, depending upon the metal of the components being joined, by welded or any other suitable heat fused metal joints. The type of joint may also be changed depending upon the nature of the final structure. It should also be understood that the base structure need not be tubular so long as at least one part is straight and has a uniform girth throughout its length permitting cross feed extrusion directly thereon.

Having described the presently preferred embodiments of the subject invention with reference to the appended drawings, it will be understood that various changes in detail will occur to those skilled in the art and such changes are intended to be encompassed as will fall within the true scope of the invention as defined in the appended claims.

What is claimed is:

1. A method for fabricating a heat exchanger for use in a corrosive environment having metal heat exchanger tubes connected between metal manifolds and coated with a protective layer of a given fluorocarbon resin comprising in combination the steps of cross feed extruding jackets of said resin onto said tubes, removing the ends of said jackets to expose the ends of said tubes for a predetermined distance, assembling said ends of said tubes into corresponding openings in said manifolds, producing heat fused metal joints between said tubes and said manifolds while maintaining the temperature of said jackets below the melting point of said resin, coating said manifolds, the exposed portions of said tubes and the ends of said jackets with said given fluorocarbon resin by spraying in dry powder form, and thereafter applying heat to fuse said sprayed on resin to provide a continuous monolithic coating of resin over said tubes and manifolds.

2. A method according to claim 1, wherein said jackets are extruded to have a wall thickness no greater than 10 mils.

3. A method according to claim 2, wherein said wall thickness is between about 4 and 6 mils.

4. A method according to claim 1, wherein said predetermined distance is about 8 times the O.D. of said tubes.

5. A method according to claim 4, wherein a chill block is applied to the ends of said jackets during the production of said joints so as to overlie end portions of said jackets and adjacent portions of said exposed ends of the tubes.

6. A method according to claim 5, wherein the length of each of said portions of said tubes covered by said chill block is about twice the O.D. of said tubes.

7. A method according to claim 1, wherein said coating of fused dry powder is provided with a thickness of at least 4 mils.

8. A method according to claim 7, wherein said coating of fused dry powder is applied through the application of at least two coats of dry powder and fusing after each coat.

9. A method according to claim 8, wherein said jackets are extruded to have a wall thickness between about 4 and 6 mils.

* * * * *